United States Patent [19]

Hoadley

[11] Patent Number: 4,793,288

[45] Date of Patent: Dec. 27, 1988

[54] PRACTIJUMPS

[76] Inventor: Francis B. Hoadley, Rte. 3, Box 30, Monticello, Fla. 32344

[21] Appl. No.: 57,635

[22] Filed: Jun. 4, 1987

Related U.S. Application Data

[63] Continuation of Ser. No. 698,900, Feb. 6, 1985, abandoned.

[51] Int. Cl.⁴ .............................................. A01K 15/02
[52] U.S. Cl. ..................... 119/29; 272/101; 272/102
[58] Field of Search ................. 119/29; 272/101, 102, 272/103

[56] References Cited

U.S. PATENT DOCUMENTS

| | | | |
|---|---|---|---|
| 1,910,080 | 5/1933 | Austin | 272/103 |
| 2,827,116 | 3/1958 | Zalovcik | 272/103 X |
| 4,183,695 | 1/1980 | Wilcox | 272/102 X |
| 4,323,034 | 4/1982 | Carlson | 272/103 X |
| 4,368,875 | 1/1983 | Weiss et al | 272/102 X |

FOREIGN PATENT DOCUMENTS

| | | | |
|---|---|---|---|
| 2048517 | 3/1971 | France | 119/29 |
| 2161720 | 7/1973 | France | 119/29 |
| 2450624 | 11/1980 | France | 119/29 |
| 64962 | 12/1949 | Netherlands | 272/101 |

Primary Examiner—Robert P. Swiatek
Attorney, Agent, or Firm—Kerkam, Stowell, Kondracki & Clarke

[57] ABSTRACT

A series of dog jumping devices use PVC pipe for frames. Boards for a high jump design and a broad jump are obtained by using commonly available vinyl house siding. A high jump design uses a piece of white vinyl downspout material. The high jump uses an arrangement where a lower board is hung from a top board and additional lower boards are hung sequentially in turn.

15 Claims, 3 Drawing Sheets

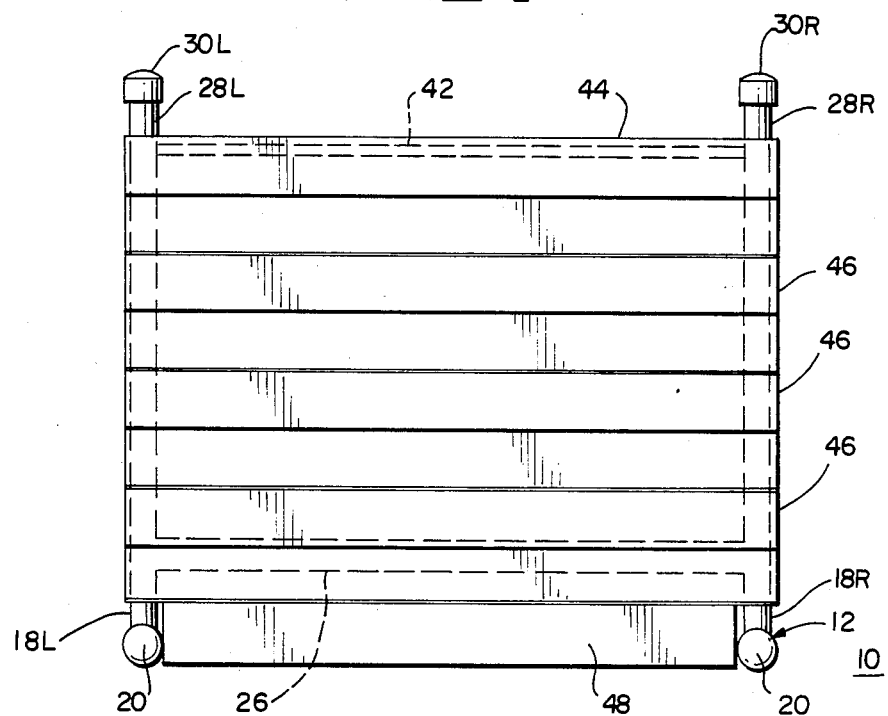
FIG 1
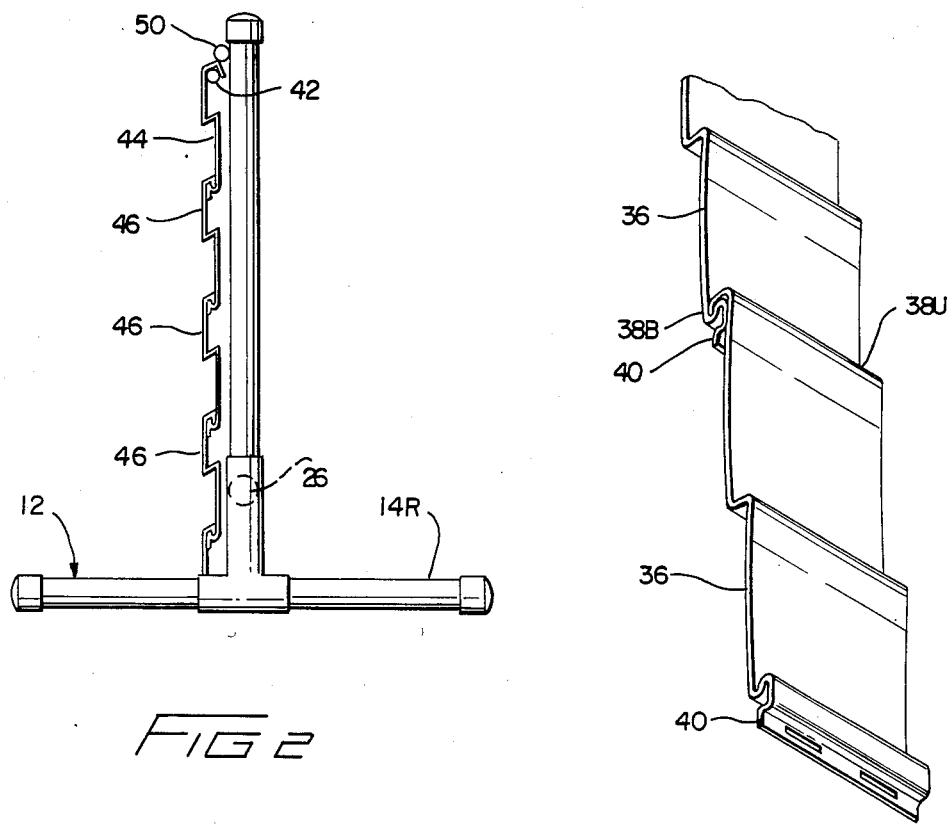
FIG 2
FIG 3

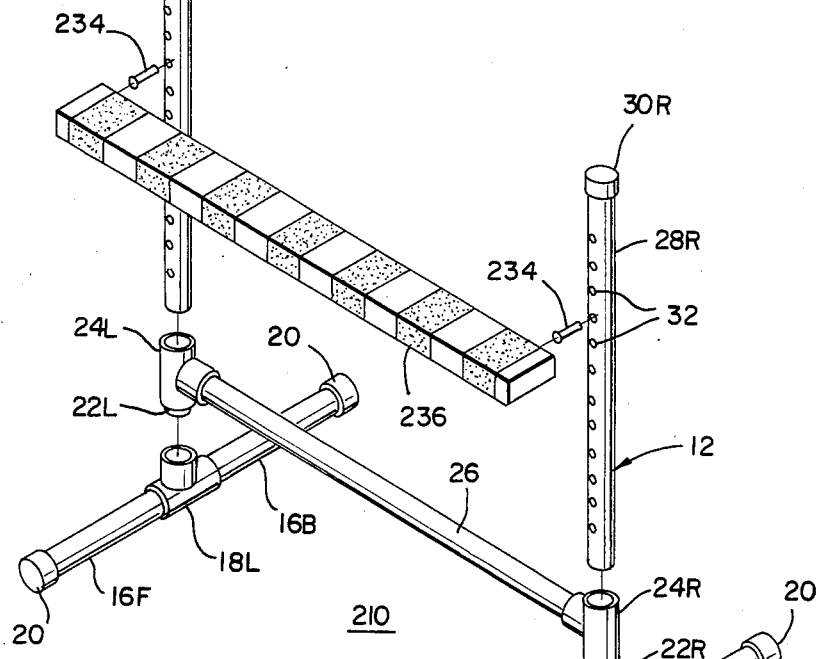

PRACTIJUMPS

This application is a continuation of Ser. No. 698,900 filed Feb. 6, 1985 and now abandoned.

BACKGROUND OF INVENTION

The present invention relates to portable obstacles (jumps) used in the training of dogs. The particular combination of common PVC (poly tubing, ABS, plastic, vinyl) and vinyl (any form or size) siding makes a very durable, weather resistant and low maintenance set of portable lightweight practice jumps. Cost to the purchaser is also reduced over specially manufactured jumps.

The American Kennel Club (AKC) has established standards for jumps (Exhibits A, B, C, and D filed with the parent application of this application) with performance levels according to breed regarding each jump.

In order to prepare a dog for performances at various AKC show sites portable obstacles (jumps) are necessary for the obedience trial participant. Many times jumps are used or left outdoors in inclement weather. Weight of individual jumps is also a consideration when transporting the jumps from site to site. The constant moving around, setting up and dismantling causes many materials to nick, dent, warp, and require constant repair. Extra tools are also necessary in some cases.

Prior Patents include the following:

U.S. Pat. Nos.

| 358,461   | 3/1887  | Lee      |
|-----------|---------|----------|
| 1,146,843 | 7/1915  | Brown    |
| 1,632,036 | 6/1927  | Mullen   |
| 1,910,080 | 5/1933  | Austin   |
| 2,827,116 | 3/1958  | Zalovcik |
| 3,394,932 | 7/1968  | Leflar   |
| 3,712,652 | 1/1973  | Uilkema  |
| 3,865,338 | 2/1975  | Campbell |
| 4,323,034 | 4/1982  | Carlson  |

Foreign Patent Document

| 2388578 | 11/1978 | France |
|---------|---------|--------|

Many attempts have been made to design better AKC equipment. One portable design (U.S. Pat. No. 2,827,116) uses a unitary frame to connect a common base, with a circular base and pins which fit into slotted uprights. The high (solid) jump "wall" is made of canvas.

Several patents (not specifically related to dog jumps), U.S. Pat. Nos. 1,146,843, 3,394,932, and 3,712,652, use metal and wood components with spring urged detent pin locking mechanisms to adjust jump heights or a bar or high (solid) jump apparatus.

Another invention specifically dealing with the bar jump and high jump (U.S. Pat. No. 4,323,034) requires white paint, is made of metal and wood, and is incomplete as a full portable set of AKC jumps made of common materials (easily obtained at any building supply store). (The other patents listed relate to dog jumps but in an even more obscure manner relative to this patent specification.)

The prior art does not have a complete set of jumps made of lightweight, durable, white (needs no painting), weatherproof materials common to all three jumps. None are made principally of solid white material.

SUMMARY OF THE INVENTION

The present invention is unique in the combination of commonly available buidling materials used to made a complete set of portable AKC jumps in a variety of widths.

All construction materials are solid white (throughout thickness) and never need painting unlike many prior art materials.

Although the present jumps are lightweight, the frame of the high and bar jumps can be filled with water or sand internally to add 15 to 18 pounds of weight that is not visible to the dog being trained. This reduces wind instability of a lightweight jump.

The AKC regulation high (solid) jump and selected prior art build the jump board by board from the bottom up. Practijumps set the top board at the proper height and each vinyl board hangs on the base of the prior board. This allows the trainer to create space to the top board, thereby facilitating training the dog for a bar jump.

All of the items used to make this set of portable jumps are available at most building materials stores. Then, with a hand drill, hacksaw, tape and pencil, construction costs or replacement parts are minimal.

The broad jump is flexible and durable enough that inexperienced dogs and trainers can step on them without damage to the resilient materials.

BRIEF DESCRIPTION OF THE DRAWINGS

The features of the present invention will be more readily understood when the following detailed description is considered in conjunction with the accompanying drawings wherein like characters represent like parts throughout the several views and in which:

FIG. 1 shows a front view of a high jump according to the present invention.

FIG. 2 shows a side view of the high jump.

FIG. 3 shows a perspective view of pieces of vinyl sliding connected together in the manner used by the present invention.

FIGS. 9, 10, 11, and 12 show side views corresponding respectively to the broad jumps of FIGS. 5, 6, 7, and 8.

FIG. 13 shows a perspective exploded view of parts of a bar jump according to the present invention.

DETAILED DESCRIPTION

Figure 4:
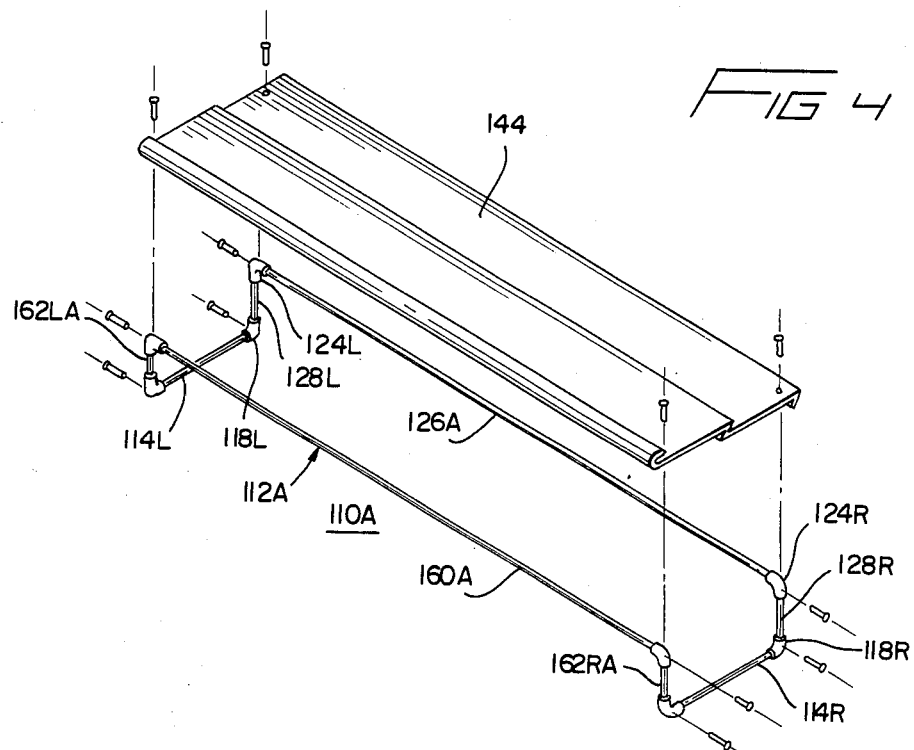
FIG. 4 shows an exploded view of parts of a broad jump according to the present invention.
Figure 5:
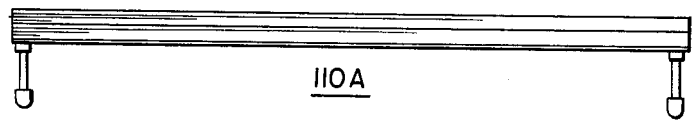
FIGS. 5, 6, 7, and 8 show front views of different size broad jumps.
Figure 6:
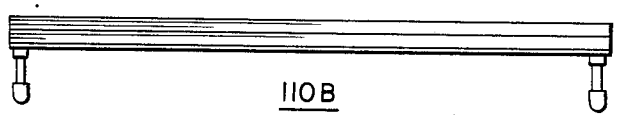
Figure 7:
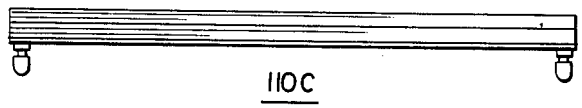

The high jump 10 according to the present invention includes a frame 12 and will now be discussed with references to FIGS. 1, 2, 3, and 13. It should be noted that FIG. 13 shows an exploded view of a bar jump 210 using an identical frame 12 as used with the high jump 10.

The frame 12, which is best shown in FIG. 13, has right and left bases 14R and 14L. Each of the bases includes front and back base members 16F and 16B respectively. Each of the front base members 16F is connected to a coresponding back base member 16B by a tee 18R or 18L. The tees 18R and 18L are glued to the corresponding base members. Each of the base members has a corresponding end cap 20 which is glued to it.

Right and left nipples 22R and 22L extend below corresponding tees 24R and 24L and allow these tees to be respectively connected to the corresponding tees 18R and 18L. Extending between the tees 24R and 24L is a cross-brace 26. Mounted in each of the tees 24R and 24L is a corresponding upright 28R or 28L, each of which has a corresponding cap 30R or 30L glued as its top.

Each of the tubular members of the frame 12 (28R, 28L, 26, 16F, and 16B) is made of white PVC pipe, preferably 1½" PR160 and Schedule 40 pipe. Although the frame material is quite light in weight, the frame 12 provides for added stability in that the cross-brace 26 and right and left bases 14R and 14L are hollow and can be filled with water or sand to increase the stability of the jump 10 or 210. As shown in FIGS. 1, 2, and 13, the cross-brace 26 extends at a higher vertical position that the bases 14R and 14L.

The uprights 28R and 28L include a series of mount holes 32 which are drilled therein and which may be used to accommodate a bolt such as bolts 234 in FIG. 13 which are used to support the bar 236 upon the uprights. The mount holes serve as a plurality of mounts. The bar 236 is made from square white vinyl downspout material and includes outdoor black tape at 2" intervals. The tape is 2" wide and provides a bar 236 having alternating 2" white and black stripes.

Although not shown, the uprights 28R and 28L may include numbers above each of the holes 32 corresponding to the height of the high jump, these numbers starting with 10". Numbering for the bar jump may begin at 12" (this numbering also not being shown) in order to incorporate the 2" thickness of the bar 236 into the measurement.

The mounting of boards upon the frame 12 to realize the high jump 10 will now be discussed with reference to FIGS. 1, 2, and 3. Advantageously, the present invention uses standard vinyl siding to provide the boards for the high jump (as well as for the broad jump discussed below). The vinyl siding, which is usually sold in 12' boards, may be cut into 4' lengths. FIG. 3 shows a perspective view of 2 pieces of vinyl siding 36. The vinyl siding may come flat or may be a double type of siding (includes a fold in the middle of the siding as shown). The lower of the siding pieces 36 includes an upper securing means 38U which is disposed outside of a bottom securing means 38B. As will be appreciated from the drawings, each of the securing means 38U and 38B are lock strips which mate to a complementary lock strip. Although not shown in FIG. 3, each of the pieces of vinyl siding 36 would be modified before use with the present invention by removal of the nailing strips 40 and, additionally, rounding of any sharp edges.

After the nailing strips 40 are removed from a plurality of pieces of house siding 36, one of the pieces 36 may be converted into a top board by placement of a ½" diameter PVC brace-pipe 42 (FIGS. 1 and 2) along the upper edge of the top board 44. The brace 42, which is preferably Schedule 40 PVC, is drilled and bolted to the top board 44. As will be readily appreciated, such bolts may extend into the holes 32 (labeled in FIG. 13 only). As best shown in FIG. 2, lower boards 46 may simply hang from the immediately above board by having the upper securing means 38U secure the board to the bottom securing means 38B (securing means best shown in FIG. 3). As best shown in FIG. 1, a bottom board 48 may have a different height and width from the boards 46 in order to allow it to fill the space below the bottom edge of the lowest of boards 46. The board 48 additionally has the shown smaller width so that it may fit within the bases 14R and 14L (bases labeled in FIG. 13 only). In the preferred embodiment, the boards 44 and three boards 46 would each be 8" in height, whereas two board 48, one 6" in height and the other 4" in height would be included. The use of the alternate boards 48 would allow one to accommodate different heights, as the holes 32 are preferably spaced at 2" intervals.

As shown in FIG. 2 only, a jump stick 50 may be rested on top of top board 44. The jump stick is preferably a pipe of 1" PVC cut to 49" long and capped at both ends. The jump stick 50 would also be striped in the same manner as the bar 236.

The high jump 10 of the present invention is highly advantageous in that the high jump is constructed by securing the top board 44 at the appropriate level of the uprights 28R and 28L. The rest of the boards (46 and 48) are then hung from the immediately preceding board to fill in the "air space" to the ground. For training purposes, one may place the jumping stick 50 as shown in FIG. 2 to provide the illusion of a bar jump. The bottom boards (46 and 48) can then gradually be removed until the bar 50 is all that remains to jump. Since the present invention is preferably sold in an assembly including both the high jump 10 and the bar jump 210, the use of identically constructed frames 12 for both the high jump and the bar jump allows one to convert easily to two bar jumps or two high jumps.

Note that the top board 44 and the high bar 236 each serve as jump members respectively in the high jump 10 and the bar jump 210.

With reference now to FIGS. 4 and 9, a broad jump 110A will now be discussed. Each of the components of the broad jump 110A will be labeled in the 100 series with the same last two digits as the corresponding component, if any, of the high jump 10. Additionally, the construction details of the smaller broad jumps 110B, 110C, and 110D will be readily appreciated by considering FIGS. 6–8 and 10–12.

The broad jump 110A includes a back cross-brace 126A extending between right and left uprights 128R and 128L. Elbow type fittings 124R and 124L are glued or connected by ⅛" aluminum sheet metal screws in order to secure them to the PVC pipe pieces used for cross-brace 126A an uprights 128R and 128L. In similar fashion, fittings 118R and 118L may be connected to bases 114R and 114L. A front cross-brace 160A extends between front uprights 162RA and 162LA. Fittings like those used for 124R and 124L may be used as shown to connect the front cross-brace 160A, front uprights or post portions 162RA and 162LA, and bases 114R and 114L. The structural members of the frame 112A are constructed of PVC pipe and may be filled with water or sand to stabilize the jump 110A.

A small amount of material may be removed from some of the fittings (such as 124R and 124L) and may be slid over to use as a shim (not shown) below the center of broad jump board 144. The board is attached to the frame 112A by aluminum sheet metal screws extending into holes at the corners of the frame. Advantageously, the board 144 is a piece of house siding, preferably vinyl, as used for boards 44 and 46 of the high jump. As shown, the board 144 has a major planar surface (i.e., its top surface) which extends at least partly in a horizontal direction.

Figure 8:
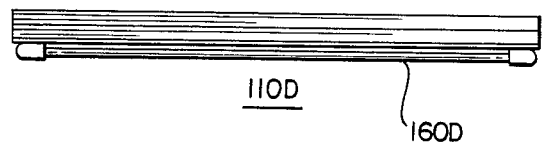

The broad jumps 110B, 110C, and 110D are constructed in similar fashion to broad jump 110A. Jump 110B simply differs in dimensions from broad jump 110A. Broad jump 110C uses 45° elbows 164 (only one visible in FIG. 11) such that the front post portions 162LC (and corresponding right post portion not visible) extend at a 45° angle to vertical. The broad jump 110D does not include any front post portions. Instead, front cross-brace 160D extends directly between the fronts of the bases as best shown in FIG. 8.

Because of the differences in lengths of the various board jumps shown in FIGS. 5-8, the broad jumps may be easily stored and stacked together. As with the pieces of house siding used for the high jump, the pieces of house siding used for the board jumps have the nailing strips and sharp edges removed.

It should also be noted that the present jumps may be readily dismantled and placed in a zippered nylon tent pull bag.

It should be emphasized that the present invention is highly advantageous by way of its construction from common materials that provide durability, minimum upkeep, and reduced cost. Because all of the materials may be purchased at most local hardware stores or building supply centers, the present set of jumping devices do not require special manufacturing processes. This results in substantial savings in manufacturing costs.

Although various specific embodiments have been described herein, it is to be understood that these are for illustrative purposes only. Various modifications and adaptations will be apparent to those of skill in the art. Accordingly, the scope of the present invention should be determined by reference to the claims appended hereto.

I claim:

1. A dog jumping apparatus comprising
   two bases disposed at opposite sides of the apparatus;
   each base including a portion extending horizontally front to back;
   two uprights extending vertically at said opposite sides, each upright having a plurality of mounts at different heights thereon;
   a top board extending between said uprights and secured at two of said mounts, said top board having lower securing means at a bottom edge thereof; and
   at least one lower board having upper securing means at a top edge, said top edge of said at least one lower board being secured to said bottom edge of said top board by said securing means of said top board mating to said securing means of said at least one lower board such that said at least one lower board is supported by said top board.

2. The dog jumping apparatus of claim 1 wherein said upper securing means and lower securing means are each lock strips which mate together.

3. The dog jumping apparatus of claim 2 wherein each of said top board and at least one lower board has securing means at upper edges and lower edges and each securing means is a lock strip.

4. The dog jumping apparatus of claim 3 wherein each of said top and lower boards is a piece of house siding.

5. The dog jumping apparatus in claim 4 wherein there is a plurality of like-constructed lower boards, each of which hangs from a board directly above it.

6. The dog jumping apparatus of claim 5 wherein each lower board is directly supported only by a board immediately above it.

7. The dog jumping apparatus of claim 4 wherein each board is vinyl.

8. The dog jumping apparatus of claim 1 wherein said at least one lower board is directly supported only by said top board.

9. The dog jumping apparatus of claim 1 wherein each of said bases includes a hollow pipe and each base is sealed at opposite ends by a cap such that each base holds water for stabilizing the apparatus.

10. The dog jumping apparatus comprising:
    two bases disposed at opposite sides of the apparatus;
    two uprights extending vertically at said opposite sides and having mounts; and
    a first board extending between said uprights and secured to said mounts; and
    wherein said first board is a piece of house siding having a top securing means along a top edge thereof and a bottom securing means along a bottom edge thereof, said top securing means operable to mate to a bottom securing means of a like-constructed piece of house siding and said bottom securing means operable to mate to a top securing means of a like-constructed piece of house siding.

11. The dog jumping apparatus of claim 10 wherein said apparatus is a high jump device, said first board is a top board, and further comprising a lower board which is a piece of house siding, and wherein a top edge of said lower board is secured to a bottom edge of said top board by securing means on said top edge of said lower board.

12. The dog jumping apparatus of claim 11 wherein each of said securing means is a lock strip.

13. The dog jumping apparatus of claim 12 wherein there is a plurality of like-constructed lower boards, each of which hangs from a board directly above it.

14. The dog jumping apparatus of claim 13 wherein each lower board is directly supported only by a board immediately above it, and wherein each board is vinyl.

15. The dog jumping apparatus of claim 10 wherein each of said bases includes a hollow pipe and each base is sealed at opposite ends by a cap such that each base holds water for stabilizing the apparatus.

* * * * *

UNITED STATES PATENT AND TRADEMARK OFFICE
CERTIFICATE OF CORRECTION

PATENT NO. : 4,793,288

DATED : December 27, 1988

INVENTOR(S) : Francis B. HOADLEY

It is certified that error appears in the above-identified patent and that said Letters Patent is hereby corrected as shown below:

Title page, item [54]:

Change "Practijumps" to -- Portable Dog Training Jumps --.

Signed and Sealed this

Third Day of November, 1992

*Attest:*

DOUGLAS B. COMER

*Attesting Officer*     *Acting Commissioner of Patents and Trademarks*